United States Patent
Goldfeld et al.

(10) Patent No.: US 10,503,508 B2
(45) Date of Patent: Dec. 10, 2019

(54) PREDICTIVE QUERY EXECUTION IN ANALYTICAL DATABASES

(71) Applicant: Sisense, Ltd., Tel-Aviv (IL)

(72) Inventors: Jonathan Goldfeld, Omer (IL); Ariel Yaroshevich, Tel-Aviv (IL); Eldad Farkash, Tel-Aviv (IL)

(73) Assignee: Sisense Ltd., Tel-Aviv (IL)

( * ) Notice: Subject to any disclaimer, the term of this patent is extended or adjusted under 35 U.S.C. 154(b) by 371 days.

(21) Appl. No.: 15/287,600

(22) Filed: Oct. 6, 2016

(65) Prior Publication Data
US 2018/0101552 A1 Apr. 12, 2018

(51) Int. Cl.
*G06F 9/30* (2018.01)
*G06F 16/2455* (2019.01)
(52) U.S. Cl.
CPC .... *G06F 9/30072* (2013.01); *G06F 16/24552* (2019.01)
(58) Field of Classification Search
CPC .......... G06F 17/30477; G06F 17/3048; G06F 16/2455; G06F 16/24552; G06F 16/24553; G06F 16/24561
See application file for complete search history.

(56) References Cited

U.S. PATENT DOCUMENTS

| | | | | |
|---|---|---|---|---|
| 6,567,804 | B1* | 5/2003 | Ramasamy | G06F 17/3046 |
| 2006/0271557 | A1* | 11/2006 | Harward | G06F 9/52 |
| 2009/0083238 | A1* | 3/2009 | Chaudhuri | G06F 17/30501 |
| 2014/0012882 | A1* | 1/2014 | Poppitz | G06F 16/2228 |
| | | | | 707/792 |
| 2016/0292194 | A1* | 10/2016 | Farkash | G06F 17/30315 |

FOREIGN PATENT DOCUMENTS

WO 2016/157191 A1 10/2016

OTHER PUBLICATIONS

Florescu, Daniela, et al. Caching strategies for data-intensive web sites. Diss. INRIA, 2000. (Year: 2000).*

* cited by examiner

*Primary Examiner* — William Spieler
(74) *Attorney, Agent, or Firm* — M&B IP Analysts, LLC (57) ABSTRACT

A computerized system (e.g. implementing a database management system, abbreviated as DBMS) and a method of operating the system is disclosed for allowing predictive execution of instructions and/or queries. As disclosed herein, in predictive execution mode (also referred to herein as "predictive mode"), instructions and/or queries are executed by the computerized system (e.g. a DBMS) before a request to execute the instructions and/or queries is received from an external entity (e.g. host).

26 Claims, 5 Drawing Sheets

PREDICTIVE QUERY EXECUTION IN ANALYTICAL DATABASES

FIELD OF THE PRESENTLY DISCLOSED SUBJECT MATTER

The presently disclosed subject matter relates to the field of databases.

BACKGROUND

Column-oriented databases are designed to store data tables as individual objects, each object corresponding to a respective column of data. Column-oriented databases are suited for online analytical processing and enable reusing (or recycling) intermediate query results of previously executed instructions. According to the operator-at-a-time execution model implemented by column-oriented databases, database queries are divided into discrete instructions which are executed individually, and each intermediate query result, resulting from a respective instruction, is materialized and can serve as an input for the next operator. The available intermediate query results can also be reused in later queries sharing common instructions.

GENERAL DESCRIPTION

According to one aspect of the presently disclosed subject matter there is provided a computer implemented method of executing queries in a database system operating according to an operator-at-a-time execution model; the method comprising, operating a processing circuitry for:

storing in a persistent computer storage medium, information indicative of instructions previously executed in the database system; responsive to an indication that at least one condition has been met:

executing a group of instructions comprising part or all of the instructions previously executed in the database system, wherein at least one given instruction in the group is executed before a corresponding request to execute the given instruction is received at the database system;

linking each intermediate, resulting from the execution of a respective instruction in the group of instructions, to a node in a data-structure, the node representing the respective instruction; storing the intermediates resulting from the execution of the instructions in the group in a computer memory (e.g. persistent computer storage medium) in the database system and rendering the intermediates to be available during execution of future database queries.

In addition to the above features, the method according to this aspect of the presently disclosed subject matter can optionally comprise one or more of features (i) to (xii) listed below, in any technically possible combination or permutation:

i). The method further comprising generating the data-structure and storing the data-structure in a persistent computer storage medium; wherein different nodes in the data-structure represent different respective intermediates and instructions, each intermediate is generated by execution of a respective instruction, the instruction being part of a query.

ii). The method further comprising: recording query history metadata characterizing the instructions previously executed in the database system; analyzing the query history metadata; and selecting, based on the analysis, the group of instructions.

iii). wherein the information indicative of instructions previously executed in the database system includes the query history metadata; and wherein the analyzing and selecting is executed following the indication that at least one condition has been met.

iv). wherein the information indicative of instructions previously executed in the database system includes the group of instructions; and wherein the analyzing and selecting is executed during normal operation of the database system before the indication that at least one condition has been met.

v). wherein the query history metadata includes information indicative of a frequency of execution and/or frequency of requests of part or all of the instructions previously executed in the database system;

the selecting comprises, adding to the group, instructions characterized by a frequency of execution and/or frequency of request which complies with at least one condition.

vi). The method further comprising, selecting the group of instructions, the selecting comprising:

identifying in the database a database schema;

adding to the group of instructions one or more instructions which are frequently used with the identified schema.

vii). wherein the at least one condition includes a system event rendering previously stored intermediates unavailable for recycling intermediates.

viii). wherein the system event includes one or more of: system reboot; system data update; and system duplication.

ix). The method further comprising, synchronizing at least the executing a group of one or more instructions, to a system idle time.

x). wherein the data-structure is a tree or graph.

xi). wherein the query history metadata is stored in the data-structure, wherein a node in the data-structure representing a given instruction is used for storing query history metadata pertaining to the given instruction.

xii). The method further comprising executing a database query, comprising:

dividing the query into one or more instructions to generate a respective instruction set; for each instruction in the instruction set, determining a respective intermediate, comprising:

if a respective intermediate is available in the computer memory, retrieving the intermediate from the computer memory;

otherwise, if a respective intermediate is not available in the computer memory, executing the instruction to determine a respective intermediate; and calculating the query result using the determined intermediates.

According to another aspect of the presently disclosed subject matter there is provided a computerized device operating in a database system operating according to an operator-at-a-time execution model; the computerized device being operatively connected to a persistent computer storage medium and comprising a processing circuitry configured to:

store in a persistent computer storage medium, information indicative of instructions previously executed in the database system; responsive to an indication that at least one condition has been met;

execute a group of instructions comprising part or all of the instructions previously executed in the database system, wherein at least one given instruction in the group is executed before a corresponding request to execute the given instruction is received at the database system; link each intermediate, resulting from the execution of a respective instruction in the group of instructions, to a node in a data-structure, the node representing the respective instruction; store the intermediates resulting from the execution of the instructions in the group in a computer memory in the database system and rendering the intermediates to be available during execution of future database queries.

According to another aspect of the presently disclosed subject matter there is provided a database management system (DBMS) comprising a query kernel operating in a database system operating according to an operator-at-a-time execution model; the query kernel being operatively connected to a persistent computer storage medium and comprising a processing circuitry configured to:

store in a persistent computer storage medium, information indicative of instructions previously executed in the database system; responsive to an indication that at least one condition has been met:

execute a group of instructions comprising part or all of the instructions previously executed in the database system, wherein at least one given instruction in the group is executed before a corresponding request to execute the given instruction is received at the database system; link each intermediate, resulting from the execution of a respective instruction in the group of instructions, to a node in a data-structure, the node representing the respective instruction; store the intermediates resulting from the execution of the instructions in the group in a computer memory in the database system and rendering the intermediates to be available during execution of future database queries.

According to another aspect of the presently disclosed subject matter there is provided a non-transitory program storage device readable by a computerized device, tangibly embodying a program of instructions executable by the computerized device to perform method operations of executing queries in a database system operating according to an operator-at-a-time execution model; the method comprising:

storing in a persistent computer storage medium, information indicative of instructions previously executed in the database system; responsive to an indication that at least one condition has been met:

executing a group of instructions comprising part or all of the instructions previously executed in the database system, wherein at least one given instruction in the group is executed before a corresponding request to execute the given instruction is received at the database system; linking each intermediate, resulting from the execution of a respective instruction in the group of instructions, to a node in a data-structure, the node representing the respective instruction; storing the intermediates resulting from the execution of the instructions in the group in a computer memory in the database system and rendering the intermediates to be available during execution of future database queries.

The computerized device, the DBMS and the program storage device disclosed in accordance with the presently disclosed subject matter can optionally comprise one or more of features (i) to (xii) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

It is noted that elements in the drawings are not necessarily drawn to scale.

DETAILED DESCRIPTION

Unless specifically stated otherwise, as apparent from the following discussions, it is appreciated that throughout the specification discussions utilizing terms such as "generating", "recording", "executing", "linking", "storing", "selecting" or the like, include action and/or processes of a computer device configured with data processing capabilities that manipulate and/or transform data into other data, said data represented as physical quantities, e.g. such as electronic quantities, and/or said data representing the physical objects.

The terms "computer", "computer/computerized-device/system", "processing unit", "machine" or variation thereof should be expansively construed to cover any kind of electronic device with data processing capabilities, comprising a processing circuitry which includes one or more computer processors comprising or otherwise operatively connected to a computer memory (including non-transitory computer memory) for executing and/or generating instructions. Such electronic devices include, by way of non-limiting example, a processor (e.g. digital signal processor (DSP), a microcontroller, a field programmable gate array (FPGA), an application specific integrated circuit (ASIC), etc.), or other devices comprising a processor and computer memory such as a personal computer, a server, a computing system, any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
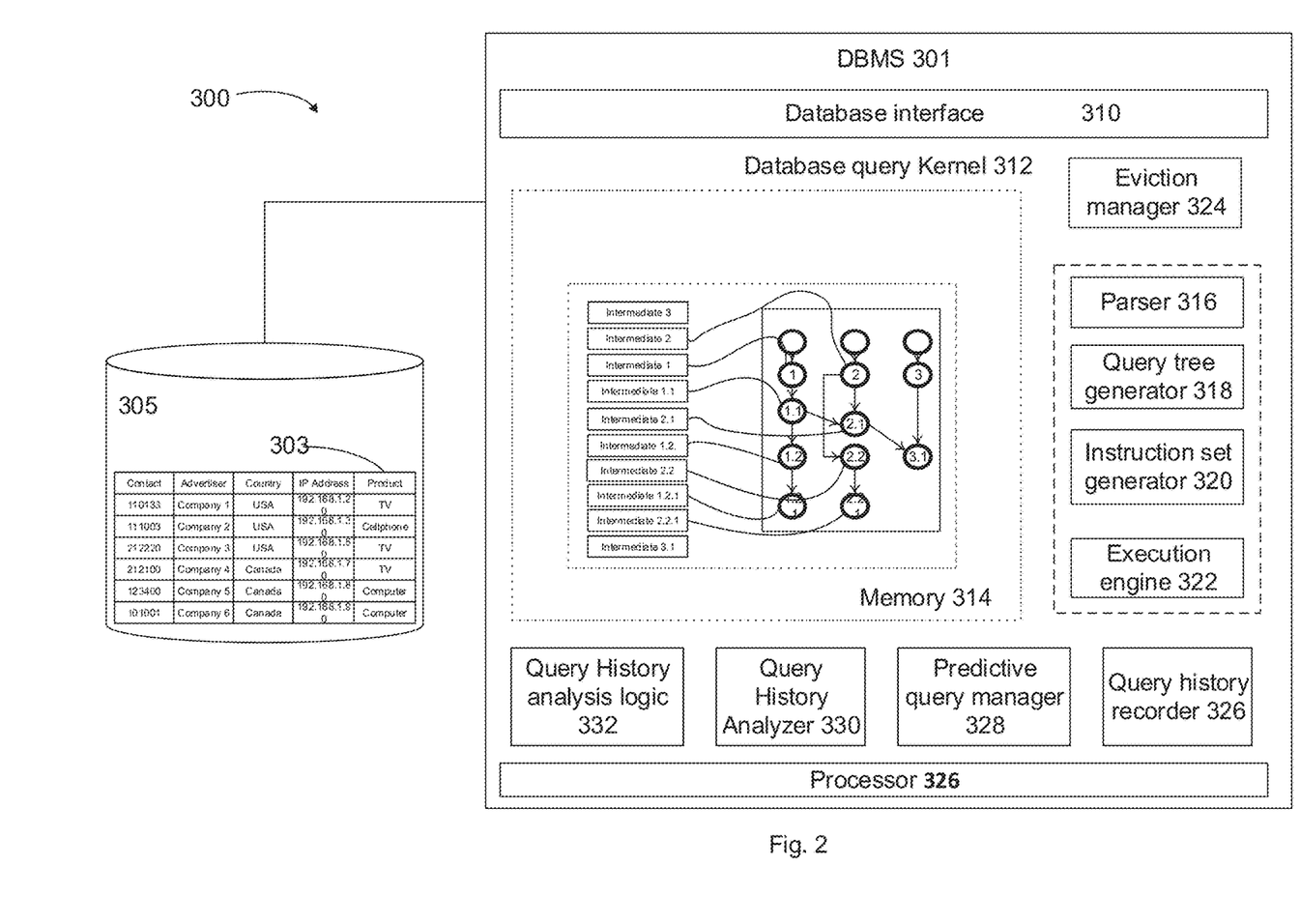
FIG. 2 is a functional block diagram of a database management system, according to some examples of the presently disclosed subject matter.
Figure 3:
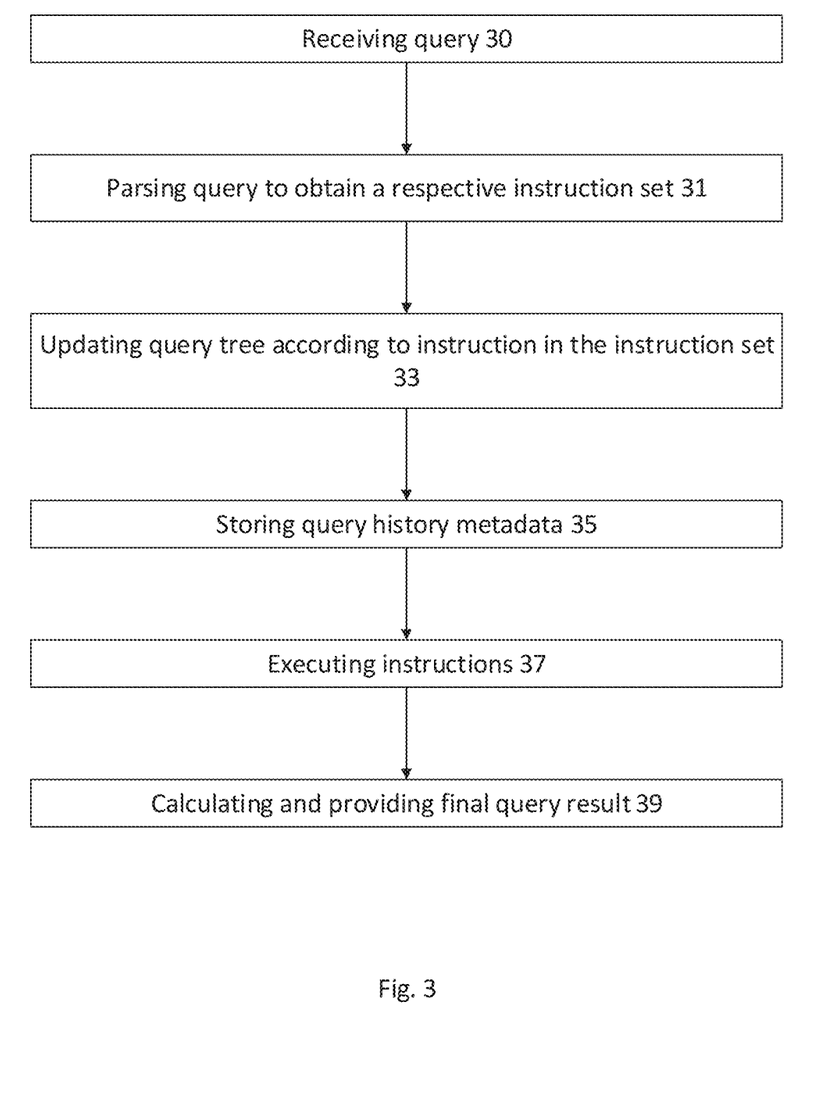
FIG. 3 is a flowchart of operations carried out in response to a database query, according to some examples of the presently disclosed subject matter.
Figure 4:
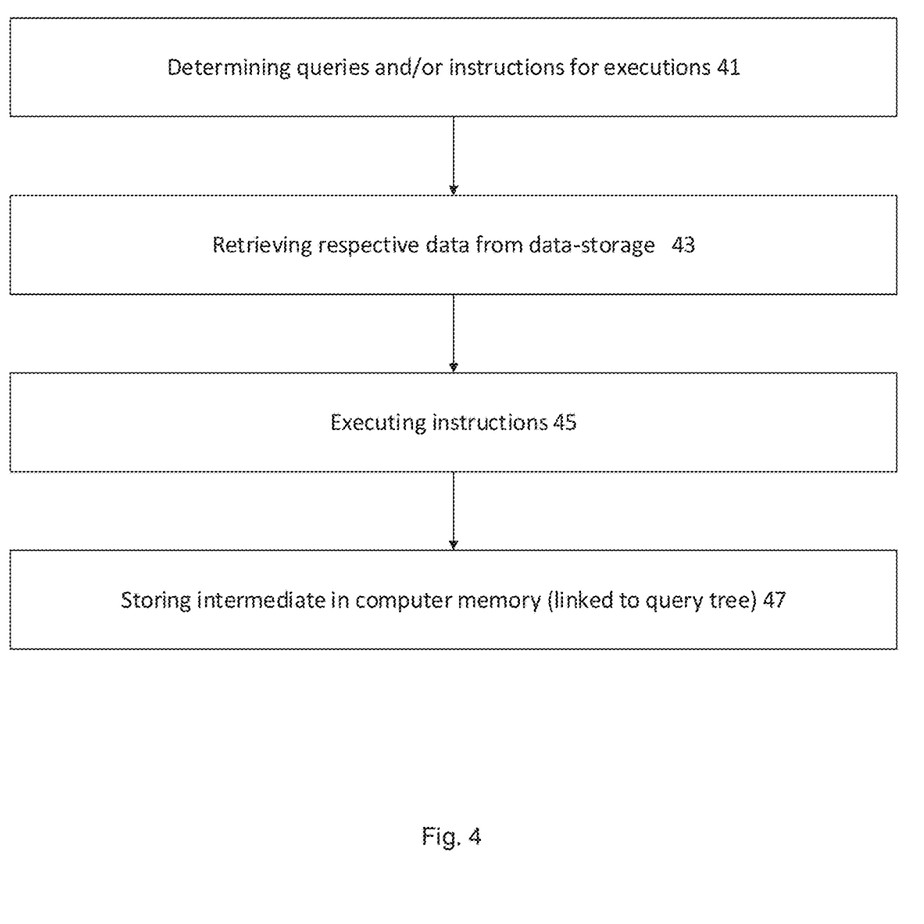
FIG. 4 is a flowchart of operations carried out during predictive query execution, according to some examples of the presently disclosed subject matter.

In embodiments of the presently disclosed subject matter, fewer, more and/or different stages than those shown in FIGS. 3 and 4 may be executed. In embodiments of the presently disclosed subject matter, one or more stages illustrated in FIGS. 3 and 4 may be executed in a different order and/or one or more groups of stages may be executed simultaneously. Elements in FIG. 2 can be made up of a combination of software and hardware and/or firmware that performs the functions as defined and explained herein.

The terms "intermediate query results", "intermediates" or "instruction data" refer to the data resulting from the execution of an instruction and are used interchangeability herein; the instruction is an operation being part of a query and is performed on one or more columns in the database.

The terms "link" or "reference" or any derivatives thereof are used herein interchangeably. A link or a reference is a value that enables to access a particular datum. For example, a node representing a certain instruction can be linked to a respective resulting intermediate stored elsewhere in the computer memory. The intermediate can be accessed via the respective node.

Figure 1:
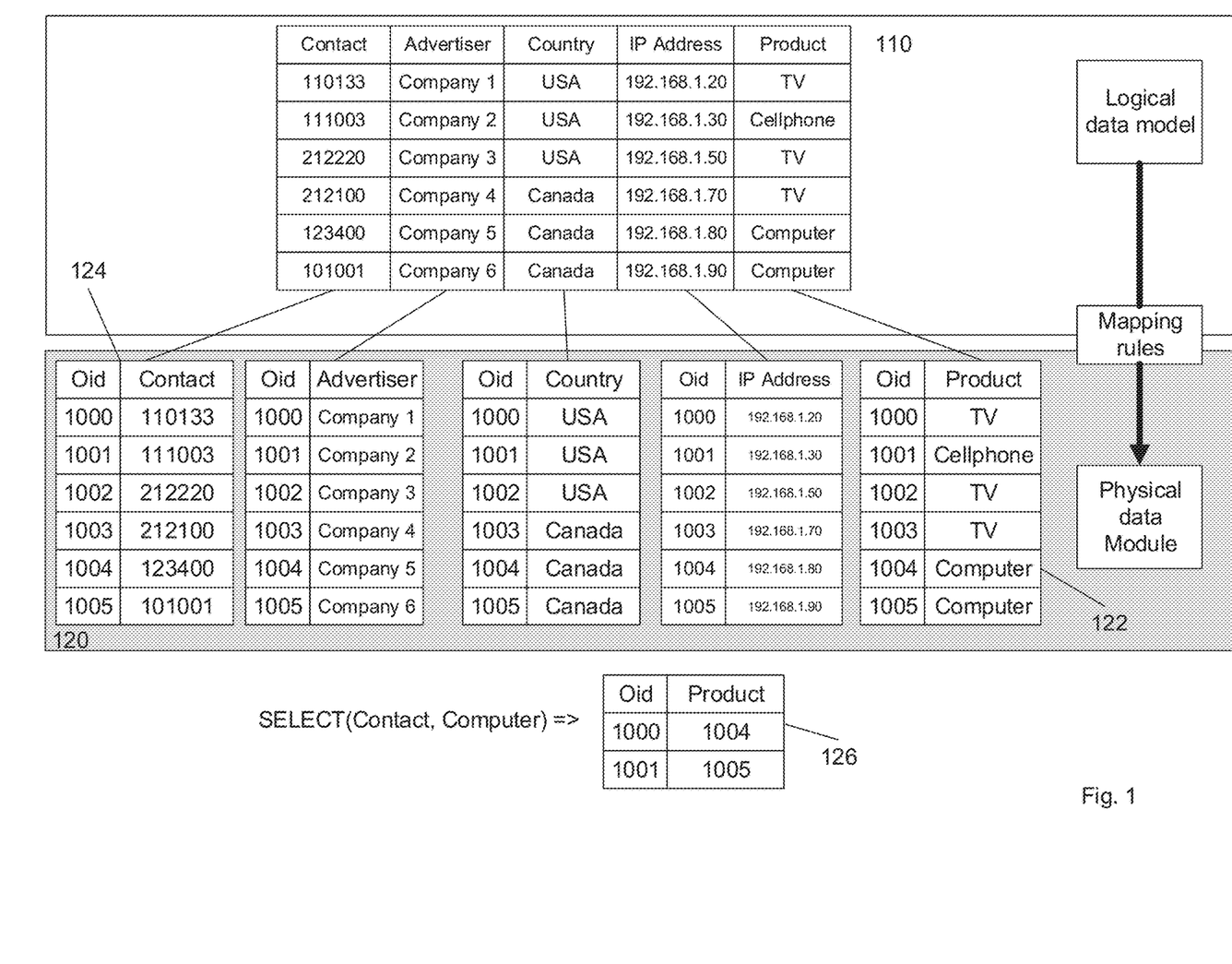
FIG. 1 is a schematic illustration demonstrating principles of a column-oriented database.

Bearing the above in mind, attention is now drawn to FIG. 1 which is a schematic illustration demonstrating some principles of a column-oriented database. Table 110 is a relational two dimensional table which represents the logical data model of the data stored in the database. Each column in table 110 comprises a set of data values pertaining to a particular type, one for each row of the table. The physical layout of the stored data is illustrated at the bottom part of the figure (120). Each column in table 110 is stored independently as a separate data object. Storing each column separately in computer data storage enables, during execution of queries, to read only the needed attributes from the relevant data object, rather than having to read entire rows from the disk and discard unneeded attributes once in memory, as done in the row-oriented approach. As data transfer costs from computer data storage often represent significant performance bottleneck in database systems, using a column-oriented database may considerably increase efficiency of query execution, especially in analytical database processing.

For example, in MonetDB architecture, which was designed primarily for data warehouse scenarios, each column is represented by a respective binary association table (BAT) and the data is manipulated using BAT algebra which consumes BATs and generates new BATs (and/or literal values, e.g. numeric values). Each BAT is a two column table with one column storing the data value and the other storing a virtual ID value effectively being the array index of the column.

MonetDB's operator-at-a-time execution model and BAT algebra enables to translate a query (e.g. an SQL query) into a set of individual instructions, where each instruction is processed individually. Each execution of each individual instruction generates a respective intermediate query result which is a data object (e.g. represented by a respective BAT) independent from all previous data objects, and may be used as an argument for other instructions.

For example, according to MonetDB's columnar algebra, the query: Select (Contact, Computer) made on database 120 would generate new BAT 126 (i.e. intermediate query result) which would be stored as a separate data object. BAT 122 and BAT 124 are not changed by this operation.

According to an aspect of the presently disclosed subject matter a computerized system (e.g. implementing a database management system, abbreviated as DBMS) and a method of operating the system is disclosed for allowing predictive execution of instructions and/or queries. As disclosed herein, in predictive execution mode (also referred to herein as "predictive mode"), instructions and/or queries are automatically executed by the computerized system (e.g. DBMS) before a request to execute the instructions and/or queries is received from an external entity (e.g. host).

As mentioned above, DBMS of column-oriented databases implementing an operator-at-a-time execution model can increase querying efficiency by recycling intermediate execution results. In certain operational scenarios, previously executed intermediates are deleted from the memory and are no longer readily available and should therefore be re-calculated. In other operational scenarios the available intermediates which are stored in the system's memory may be not relevant, for example due to changes in the "base data" (the data stored in the database) which is the root of the computation path. In both cases, previously calculated intermediates cannot be used for recycling.

According to the approach suggested herein, in such operational scenarios, part or all of previously executed instructions are re-executed automatically by the system, before respective queries are received, and the resulting intermediates are stored in the computer memory and made available for recycling during the execution of future queries.

According to some examples of the presently disclosed subject matter, in order to enable predictive execution of intermediates, a data-structure is used for recording query execution history including the progression semantics of instructions of one or more previously executed queries (representing the semantic union of previously executed queries). The data-structure can be stored for example in a persistent computer storage medium (sometimes also referred to as a "non-volatile memory") and is used for identifying and executing instructions in predictive execution mode.

The use of a data-structure in a DBMS for storing query execution history is disclosed in an earlier Patent Application filed by the Applicant (International Patent Application No. PCT/IL2016/050347 to the Applicant filed on Mar. 31, 2016, claiming priority from U.S. patent application Ser. No. 14/677,285 and referred herein below as "earlier Patent Application") which is incorporated herein by reference in its entirety.

In the earlier Patent Application it is suggested to use a hierarchical data-structure (e.g. a tree or a graph such as directed acyclic graph, also referred to by way of example only as a "query tree") for recording and mapping executed queries. The hierarchical data-structure represents the progression semantics of instructions of one or more queries (representing a database query execution history).

Each instruction in an instruction set of a query executed by the DBMS is represented by a respective node (also known as entry or vertex) in the data-structure. A node in the data-structure comprises metadata identifying a corresponding instruction and is associated to the instruction data (e.g. by way of a reference\link enabling to access the instruction data resulting from the execution of the instruction which is stored elsewhere) itself which is stored in the computer memory as well (if it is materialized, i.e. not deleted from memory, as explained below).

The earlier Patent Application further stipulates that in some examples nodes are not deleted from the data-structure, which mostly grows in size. During an eviction process (i.e. controlled deletion of data from the computer memory, controlled for example by eviction manager 324), one or more intermediates are deleted from the computer memory, while the one or more respective nodes, representing the evicted intermediates in the data-structure, are not deleted and are maintained in the data-structure.

The eviction process according to the presently disclosed subject matter is also described in the earlier Patent Application. See for example description with reference to FIGS. 7a, 7b and 7c in the earlier Patent Application.

By using a heretical data-structure and leaving historical nodes in the data-structure, the interrelations between the nodes associated with both currently evicted and currently stored intermediates are maintained and the stored intermediates can be retrieved from the data storage during a recycling process.

This approach enables to implement a variety of eviction policies which conserve much of the recycling capability at a considerably lower memory cost. For example, this approach allows preserving intermediates represented by low level nodes in the data-structure (e.g. leaf nodes, which generally represent the culmination of the instructions' execution paths) in the computer memory, while evicting from the computer memory intermediates represented by higher level nodes (the parent nodes) in the data-structure.

According to the presently disclosed subject matter it is suggested to use a data-structure (e.g. query tree as disclosed in the earlier Patent Application) for storing historical information pertaining to instructions executed in the past as described above, and to use the stored information for executing instructions in predictive mode. Notably, the query tree described in the earlier Patent Application is one example of a data-structure which can be used according to the presently disclosed subject matter, however, it should not be construed as limiting, and other data-structures may be used.

As the execution of many of the queries and/or instructions in common analytical databases querying are repeated, they can be predicted based on the database query execution history. According to one example, when operating in predictive mode, the DBMS can make use of a learning algorithm for predicting those instructions which are likely to be requested in the future, and execute these instructions before the respective request is actually received. Learning algorithms can include for example the analysis of usage statistics based on information from the query tree gathered over time and identification of frequently occurring instructions.

Figure 5:
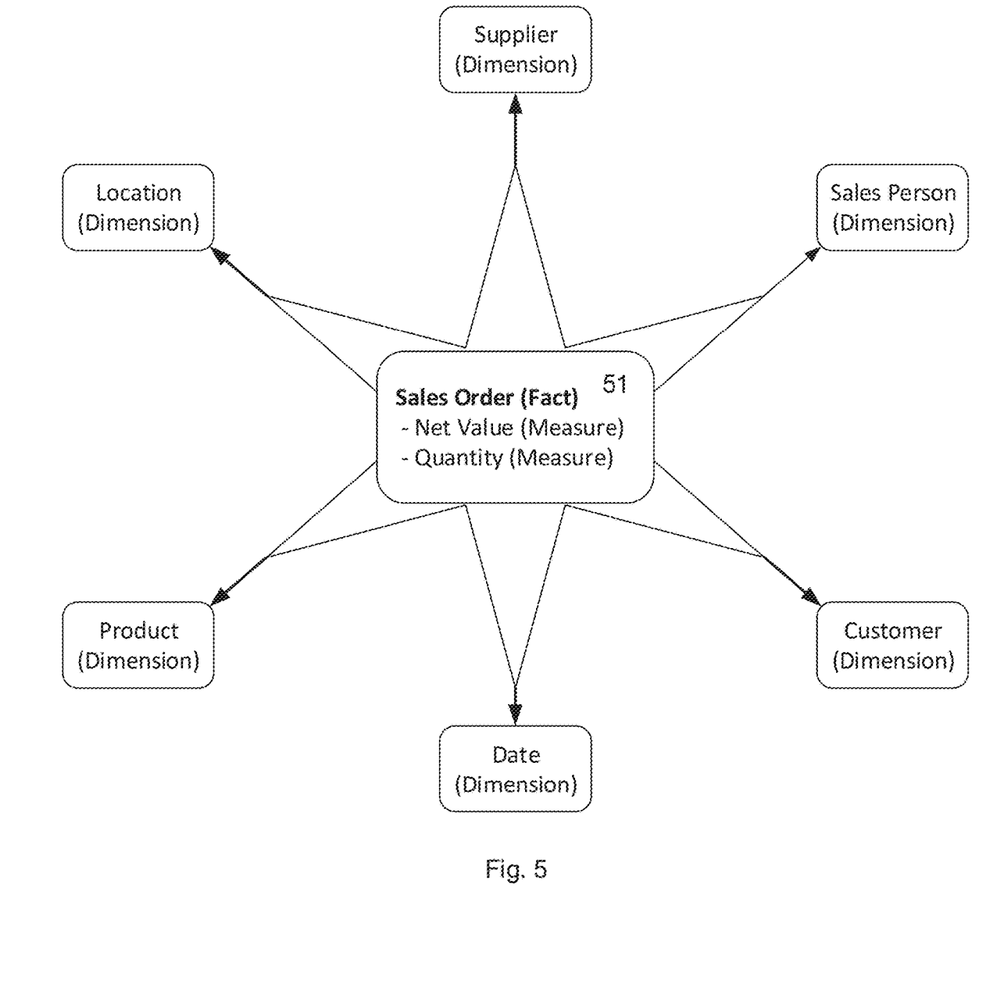
FIG. 5 is a schematic illustration of an example of a star schema.

Furthermore, in general, analytical databases are characterized by intensive use of aggregate query operations, which can be related to a moderate number of prototypical schemas representing these query operations. For example a star schema is a common type of structure used in analytical databases. FIG. 5 shows a schematic illustration of a star schema. A star schema includes fact tables (51) and dimension tables. Facts tables record measurements or metrics (typically of numeric values) and keys connecting the fact table to dimension tables, where descriptive information is recorded. Another commonly used schema in analytical scenarios is a "Snow Flake" schema.

Considering star schemas for example, some typical types of queries are frequently used when star schemas are involved. Such frequently used queries include aggregations over the Measures of the Fact table, grouped by and/or filtered by categories from the dimension tables.

According to the presently disclosed subject matter, it is suggested to automatically recognize specific schema types and pre-compute, in predictive mode, queries which are frequently used with such schemas. For instance star schemas can be identified using standard machine learning techniques, which are well known in the art. Once recognized in the database, queries which are frequently used with star schemas are pre-computed, before a respective query request is received from a user, and the respective intermediates are stored in the persistent computer storage medium.

Executing frequently asked queries in predictive mode can help to reduce the query response time even in those cases where the data has been changed. This is not possible when using caching algorithms which do not maintain a data-structure (e.g. query tree) representing querying history as disclosed herein.

Furthermore, by operating in predictive mode, the utilization of system resources can be improved, as predictive mode can be executed during idle time (e.g. when the CPU has completed all or at least a certain predefined part of its pending tasks. This allows predictive mode execution to run as low priority background programs and thereby limit their effect on the performance of other applications) when the system is not busy responding to other queries.

Executing queries in predictive mode can also help to alleviate the performance degradation which is common to "cold runs", i.e. running queries immediately after system restart/update. When a database system is restarted (re-booted) the stored data is deleted from non-persistent computer storage medium, thus leaving only the "base data" (the actual data stored in the database) stored on the persistent computer storage medium, while intermediates which were calculated during execution of queries and stored in the system's non-persistent computer storage are lost and are therefore unavailable during execution of queries after system reboot. When a database system is updated, intermediates calculated, based on the data preceding the update, become irrelevant.

Intermediates calculated in predictive mode following system reboot or update are stored in the computer memory (e.g. a persistent storage medium) and can be used during queries and thereby help to reduce processing time and processing resource consumption during query execution.

FIG. 2 is a functional block diagram of a database management system in accordance with examples of the presently disclosed subject matter. Storage system 300 can comprise for example query database management system (DBMS) 301 operatively connected to data storage 305 configured to implement a column-oriented database 303 for storing data. Data storage 305 comprises a physical storage space with one or more storage devices. The storage devices may be any one of Hard Disk devices (HDD) or Solid State Drives (SSD, comprising for example, a plurality of NAND elements) or any other appropriate data storage device. DBMS 301 is a computerized device configured in general to enable control and management of the database 303 and to allow execution of various database related operations such as definition, creation, querying, update, and administration of databases.

According to some examples of the presently disclosed subject matter, DBMS 301 comprises interface 310 configured to provide access to the query kernel 312 and enable interaction of users or other external applications or devices with database 303.

According to one non-limiting example, query kernel 312 can comprise parser 316, query tree generator 318, instructions set generator 320, execution engine 322, and eviction manager 324. Query kernel is operatively connected to (e.g. comprises) computer memory 314 and cache memory. Query kernel 312 is operatively connected to one or more computer processors 326 configured, inter alia, to execute various operations.

FIG. 2 also schematically illustrates intermediate query results (intermediates 1 to 3.1) stored in computer memory 314. Data-structure (query tree) 320 logically represents the instructions execution semantics history and is logically linked to respective intermediates which are also stored in computer memory 314.

FIG. 3 is a flowchart illustrating a sequence of operations performed during query execution according to examples of the presently disclosed subject matter. For better clarity, operations in FIG. 3, (as well as FIG. 4 below) are described with reference to corresponding elements which are illustrated in FIG. 2. However, this is done by way of example only and thus should not be construed to limit the scope of the presently disclosed subject matter to the specific structure of the system exemplified in FIG. 2.

In general, query kernel 312 is configured to execute (with the help of one or more processors 326) queries and manage resources such as computer memory 314. As shown, one or more queries are received at query kernel 312 (block 30) where each query is parsed to a set of discrete instructions giving rise to a respective instruction set (block 31). Query parsing and generation of the instruction set can be carried out for example by parser 316.

As explained above, query kernel 312 can be configured to store in memory 314 a data-structure (e.g. query tree, otherwise also referred to as "global query tree") logically representing currently available intermediate query results in the computer memory, generated during the execution of one or more queries.

For each processed query, the query tree is updated (block 33) (e.g. with the help of query tree generator 318) according to the instructions included in the respective instruction set of the query (as described further in the earlier Patent Applications). Responsive to receiving a query, the query tree is updated, if necessary, to include a node for each instruction in the instruction set. Notably, according to the presently disclosed subject matter, nodes representing a given instruction, may exist in the query tree while the respective instruction data (instruction result) has been evicted from the computer memory and is not available.

Updating of the query tree is also described in the earlier Patent Application. See for example description with reference to FIG. 4 (block 405), FIG. 5a and FIG. 6 in the earlier Patent Application.

Furthermore, according to some examples of the presently disclosed subject matter, during execution of a query, query history metadata is recorded and stored (block 35). To this end DBMS 301 can further comprise query history recorder 326 configured to retrieve and store relevant query history metadata.

Query history metadata can include various parameters describing executed instructions and queries, as well as the respective intermediates. Query history can include for example, one or more of:

The number of times each query and/or each instruction has been executed; the date and time each request for a given query has been received; the entity which has requested each execution of a given instruction; the average computing time of each instruction; the average time-period between requests for requesting the same instruction data; the size of the instruction data; the number of times a node was used for extending the query tree (with new child nodes of the node); etc.

The query history metadata can be stored in the same data-structure used for storing the query execution semantics history (e.g. query tree). The history metadata of a given instruction can be stored or linked to a node in the data-structure, representing the given instruction. In other examples the history metadata can be stored in a different data-structure e.g. one which is dedicated for storing query history metadata and is linked to the query tree.

As mentioned above, in order to avoid data loss during system reboot or other scenarios of computer memory loss, according to some examples the query tree is stored in a persistent computer storage medium (e.g. a storage device such as disk 305 or some other flash memory device (e.g. NVRAM)). In order to reduce system degradation, updates to the query tree can be initially stored in volatile computer memory (e.g. RAM) and accumulated data is periodically copied to the system's persistent computer storage medium. In those cases where the history metadata is stored in a dedicated data-structure, the dedicated data-structure can be copied to the persistent computer storage medium in a similar manner.

At block 37 instructions are executed (e.g. with the help of execution engine 322). During execution of the instructions, part or all of the nodes representing instruction of a processed query, are traversed. If necessary, for calculating a needed intermediate, an instruction for which the respective intermediate is not available in the computer memory is executed, while an instruction for which the respective intermediate is available in the computer memory, is not executed, and the intermediate is retrieved from the computer memory. The final query result is calculated based on the collection of intermediates obtained for different instructions in the instruction set (block 39).

Operations described with respect to blocks 37 and 39 are also described in the earlier Patent Application. See for example description with reference to FIG. 5b in the earlier Patent Application.

Attention is now drawn to FIG. 4, which is a flowchart of operations performed during predictive query execution according to examples of the presently disclosed subject matter.

As mentioned above, predictive query execution can be executed in various operational scenarios. These operational scenarios include for example the following system events:

System reboot—during system reboot the computer memory is evicted and accordingly previously executed intermediates are no longer available. Query execution in predictive mode can be used for calculating intermediates which are likely to be used in future query executions once the system is running again.

System data update—after the stored data is updated, part or all of the intermediates stored in the computer memory, which have been executed based on the old data before update, are no longer relevant. Query execution in predictive mode can be used for calculating intermediates which are based on the updated data and are likely to be used in future query executions following the update.

System duplication—system duplication is sometimes executed for the purpose of redundancy and/or for increasing system availability. Predictive query execution can be executed in the duplicated system.

According to one example, query kernel 312 can comprise predictive query manager 328 configured to determine whether at least one condition (e.g. one of the above operational scenarios are detected) is met and to initiate predictive query execution if so. For example, predictive query manager 328 can be configured responsive to a system reboot, system update, system duplication, or the like, to generate instructions to initiate predictive query execution. Alternatively, predictive query execution can be initiated responsive to a received command (e.g. received from an administrator at predictive query manager 328).

As mentioned above, the execution of part or all of the operations related to predictive query execution can be synchronized with the system processing idle time. Accordingly, predictive query manager 328 can be configured, following detection of at least one condition calling for predictive query execution, to delay the execution of part or all of the related operations, monitor the system status, and generate instructions to execute the delayed operations once it is detected that the system is in idle time.

At block 41 queries and/or instructions for execution during predictive query execution are determined. To this end query history metadata is retrieved e.g. from the persistent computer storage medium where it has been stored and is analyzed for determining which queries and/or instructions should be executed. This can be executed for example by query history analyzer 330.

Analysis of the query history can be done using query history analysis logic (332) defining rules for prioritizing instructions/queries during predicted query executions. According to one example, analysis of the query history metadata includes determining the frequency of each instruction and/or query and executing instructions based on their frequency.

In one example, N most frequently executed instructions and/or queries can be selected to be executed during predicted query execution. Alternatively or additionally, any instruction and/or query characterized by execution frequency greater than a certain value is executed during predicted query execution.

Execution frequency can be defined in some examples by the number of times a respective instruction and/or query has been executed, or in other examples by the number of times it has been requested to be executed (as requested queries may not always be executed e.g. in case the respective result is available in the computer memory and can be therefore recycled).

Other metadata parameters can be used instead of or in addition to the frequency parameters. For example, queries initiated by certain entities (e.g. specific commercial clients) can receive priority over queries initiated by other entities. This approach can provide better performance during database querying performed by selected entities. Additional examples of parameters of querying history metadata which can be used for selecting instructions/queries for execution in predictive mode are detailed above with respect to block 35. A combination of parameters can be used for this purpose as well. For example, from the most frequently executed queries, only those requiring computing time under a certain threshold value can be selected.

Notably, in some examples, selection of instructions and/or queries for execution in predictive mode can be performed during normal runtime of the database system rather than after a system event. According to this example, the selection can be performed as an ongoing process. For instant, selection can be invoked periodically during operation of the system (e.g. after the operations described above with reference to block 35), where the accumulated history metadata is analyzed and instructions and/or queries are selected as described above with reference to block 41. As explained above, these operations can optionally be synchronized to system idle time. Information identifying the selected instructions and/or queries is stored in the persistent computer storage medium. Following a system event (of any other appropriate operational scenario) the information identifying the selected instructions and/or queries can be retrieved from the storage and the selected instructions and/or queries are re-computed.

In some cases, all past instructions recorded in the data-structure are selected for re-execution. For example, in case the number of instructions recorded in the data-structure is lower than some value, and/or the collective memory space needed for storing all the calculated intermediates is lower than by some value, and/or a metric on the collective computation time needed for calculating all the intermediates is lower than by some value (e.g. number of CPU cores, is lower than some value, etc.).

Furthermore, as explained above, according to some examples, certain database schemas (e.g. star schema, snow flake schema, etc.) are identified in the stored data and respective queries which are frequently used in relation to the identified schema are determined as suitable for execution in predictive mode.

Once it has been determined which of the instructions and/or queries should be executed during predicted query execution, the respective data needed for the execution of the selected instructions and/or queries is retrieved from the data-storage (305) and loaded to the computer memory (block 43). The instructions and/or queries are constructed with the loaded data and executed (block 45).

According to one example, predictive query manager 328 is configured to generate and provide the selected instructions and/or queries to execution engine 322.

Intermediates resulting from the execution of the instruction, as well as the final query result, can be stored (e.g. in RAM or in a persistent computer storage medium) while being linked to the respective node in the query tree, as described above (block 37). If the node is not available, a new node is generated and added to the query tree. As explained above, nodes in the new query tree represent respective intermediates, whereas the query tree preserves the overall semantics of the executed queries. Each node references a respective intermediate. The stored intermediates are made available to be used during the execution of future queries when they are received at the DBMS (e.g. from external hosts).

It is to be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the machine for executing the method of the presently disclosed subject matter.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer implemented method of executing queries in a database system operating according to an operator-at-a-time execution model; the method comprising, operating a processing circuitry for:

storing in a persistent computer storage medium, information indicative of instructions previously executed in the database system;

responsive to an indication that at least one condition has been met:

executing a group of instructions comprising part or all of the instructions previously executed in the database system, wherein at least one given instruction in the group is executed before a corresponding request to execute the given instruction is received at the database system;

linking each intermediate, resulting from the execution of a respective instruction in the group of instructions, to a node in a data-structure that interrelates the node to at least one other node of the data-structure, the node representing the respective instruction, wherein different nodes in the data-structure represent different respective intermediates and instructions, wherein each intermediate is generated by execution of a respective instruction being part of a query;

storing the intermediates resulting from the execution of the instructions in the group in a computer memory in the database system and rendering the intermediates to be available during execution of future database queries.

2. The method according to claim 1 further comprising:
recording query history metadata characterizing the instructions previously executed in the database system;
analyzing the query history metadata; and
selecting, based on the analysis, the group of instructions.

3. The method of claim 2, wherein the information indicative of instructions previously executed in the database system includes the query history metadata; and wherein the analyzing and selecting is executed following the indication that at least one condition has been met.

4. The method of claim 2, wherein the information indicative of instructions previously executed in the database system includes the group of instructions; and wherein the analyzing and selecting is executed during normal operation of the database system before the indication that at least one condition has been met.

5. The method of claim 2, wherein the query history metadata includes information indicative of a frequency of execution and/or frequency of requests of part or all of the instructions previously executed in the database system;
the selecting comprises, adding to the group, instructions characterized by a frequency of execution and/or frequency of request which complies with one or more conditions.

6. The method of claim 1 further comprising, selecting the group of instructions, the selecting comprising:
identifying in the database a database schema; and
adding to the group of instructions one or more instructions which are frequently used with the identified schema.

7. The method of claim 6 wherein the schema is a star schema.

8. The method of claim 1 wherein the at least one condition includes a system event rendering previously stored intermediates unavailable for recycling intermediates.

9. The method of claim 8 wherein the system event includes one or more of: system reboot; system data update; and system duplication.

10. The method of claim 1 further comprising synchronizing at least the executing a group of one or more instructions, to a system idle time.

11. The method of claim 1 wherein the data-structure is one of a tree and a graph.

12. The method of claim 1 wherein the query history metadata is stored in the data-structure, wherein a node in the data-structure representing a given instruction is used for storing query history metadata pertaining to the given instruction.

13. The method of claim 1 further comprising executing a database query, comprising:
dividing the query into one or more instructions to generate a respective instruction set;
for each instruction in the instruction set, determining a respective intermediate, comprising: when a respective intermediate is available in the computer memory, retrieving the intermediate from the computer memory;
otherwise, when a respective intermediate is not available in the computer memory, executing the instruction to determine a respective intermediate; and
calculating the query result using the determined intermediates.

14. A computerized device operating in a database system operating according to an operator-at-a-time execution model; the computerized device being operatively connected to a persistent computer storage medium and comprising a processing circuitry configured to:
store in a persistent computer storage medium, information indicative of instructions previously executed in the database system;
responsive to an indication that at least one condition has been met:
execute a group of instructions comprising part or all of the instructions previously executed in the database system, wherein at least one given instruction in the group is executed before a corresponding request to execute the given instruction is received at the database system;
link each intermediate, resulting from the execution of a respective instruction in the group of instructions, to a node in a data-structure that interrelates the node to at least one other node of the data-structure, the node representing the respective instruction, wherein different nodes in the data-structure represent different respective intermediates and instructions, wherein each intermediate is generated by execution of a respective instruction being part of a query;
store the intermediates resulting from the execution of the instructions in the group in a computer memory in the database system and rendering the intermediates to be available during execution of future database queries.

15. The computerized device of claim 14 wherein the processing circuitry is further configured to:
record query history metadata characterizing the instructions previously executed in the database system;
analyze the query history metadata; and select, based on the analysis, the group of instructions.

16. The computerized device of claim 15, wherein the information indicative of instructions previously executed in the database system includes the query history metadata; and wherein the analyzing and selecting is executed following the indication that at least one condition has been met.

17. The computerized device of claim 15, wherein the information indicative of instructions previously executed in the database system includes the group of instructions; and wherein the analyzing and selecting is executed during normal operation of the database system before the indication that at least one condition has been met.

18. The computerized device of claim 15, wherein the query history metadata includes information indicative of a frequency of execution and/or frequency of requests of part or all of the instructions previously executed in the database system;
the processing circuitry is configured for selecting the group of instructions to: add to the group instructions characterized by a frequency of execution and/or frequency of request which complies with one or more conditions.

19. The computerized device of claim 14 wherein the processing circuitry is further configured to select the group of instructions, the selecting comprising:
identifying in the database a database schema;
adding to the group of instructions one or more instructions which are frequently used with the identified schema.

20. The computerized device of claim 14 wherein the at least one condition includes a system event rendering previously stored intermediates unavailable for recycling intermediates.

21. The computerized device of claim 20 wherein the system event includes one or more of: system reboot; system data update; and system duplication.

22. The computerized device of claim 20 wherein the processing circuitry is configured to synchronize at least the executing a group of one or more instructions, to a system idle time.

23. The computerized device of claim 14 wherein the data-structure is one of a tree and a graph.

24. The computerized device of claim 14, wherein the processing circuitry is further configured to store the query history metadata in the data-structure, wherein a node in the data-structure representing a given instruction is used for storing query history metadata pertaining to the given instruction.

25. A database management system (DBMS) comprising a query kernel operating in a database system operating according to an operator-at-a-time execution model; the query kernel being operatively connected to a persistent computer storage medium and comprising a processing circuitry configured to:
store in a persistent computer storage medium, information indicative of instructions previously executed in the database system;
responsive to an indication that at least one condition has been met:
execute a group of instructions comprising part or all of the instructions previously executed in the database system, wherein at least one given instruction in the group is executed before a corresponding request to execute the given instruction is received at the database system;
link each intermediate, resulting from the execution of a respective instruction in the group of instructions, to a node in a data-structure that interrelates the node to at least one other node of the data-structure, the node representing the respective instruction, wherein different nodes in the data-structure represent different respective intermediates and instructions, wherein each intermediate is generated by execution of a respective instruction being part of a query;
store the intermediates resulting from the execution of the instructions in the group in a computer memory in the database system and rendering the intermediates to be available during execution of future database queries.

26. A non-transitory program storage device readable by a computerized device, tangibly embodying a program of instructions executable by the computerized device to perform method operations of executing queries in a database system operating according to an operator-at-a-time execution model; the method comprising:
storing in a persistent computer storage medium, information indicative of instructions previously executed in the database system;
responsive to an indication that at least one condition has been met:
executing a group of instructions comprising part or all of the instructions previously executed in the database system, wherein at least one given instruction in the group is executed before a corresponding request to execute the given instruction is received at the database system;
linking each intermediate, resulting from the execution of a respective instruction in the group of instructions, to a node in a data-structure that interrelates the node to at least one other node of the data-structure, the node representing the respective instruction, wherein different nodes in the data-structure represent different respective intermediates and instructions, wherein each intermediate is generated by execution of a respective instruction being part of a query;
storing the intermediates resulting from the execution of the instructions in the group in a computer memory in the database system and rendering the intermediates to be available during execution of future database queries.

* * * * *